United States Patent

Tsai

(10) Patent No.: US 8,964,799 B2
(45) Date of Patent: Feb. 24, 2015

(54) Q-SWITCHING-INDUCED GAIN-SWITCHED ERBIUM PULSE LASER SYSTEM

(75) Inventor: Tzong-Yow Tsai, Tainan (TW)

(73) Assignee: National Cheng Kung University, Tainan (TW)

( * ) Notice: Subject to any disclaimer, the term of this patent is extended or adjusted under 35 U.S.C. 154(b) by 265 days.

(21) Appl. No.: 13/547,291

(22) Filed: Jul. 12, 2012

(65) Prior Publication Data

US 2013/0016422 A1    Jan. 17, 2013

(30) Foreign Application Priority Data

Jul. 13, 2011   (TW) .............................. 100124785 A

(51) Int. Cl.
| | |
|---|---|
| *H01S 3/082* | (2006.01) |
| *H01S 3/113* | (2006.01) |
| *H01S 3/067* | (2006.01) |
| *H01S 3/08* | (2006.01) |
| *H01S 3/0941* | (2006.01) |
| *H01S 3/16* | (2006.01) |
| *H01S 3/17* | (2006.01) |

(52) U.S. Cl.
CPC .............. *H01S 3/082* (2013.01); *H01S 3/0809* (2013.01); *H01S 3/0675* (2013.01); *H01S 3/08059* (2013.01); *H01S 3/09415* (2013.01); *H01S 3/113* (2013.01); *H01S 3/1608* (2013.01); *H01S 3/173* (2013.01)
USPC .................................... 372/11; 372/6; 372/97

(58) Field of Classification Search
CPC ... H01S 3/113; H01S 3/1608; H01S 3/09415; H01S 3/08059; H01S 3/0675; H01S 3/0809; H01S 3/082

USPC ............ 372/6, 10, 11, 40, 97; 359/340, 341.1
See application file for complete search history.

(56) References Cited

U.S. PATENT DOCUMENTS

| | | | | | |
|---|---|---|---|---|---|
| 5,675,594 | A | * | 10/1997 | Hovis et al. ...................... | 372/22 |
| 6,360,040 | B1 | * | 3/2002 | Srinivasan et al. .............. | 385/33 |
| 6,510,276 | B1 | * | 1/2003 | Jain et al. ........................ | 385/142 |
| 6,891,878 | B2 | * | 5/2005 | Spariosu et al. ................ | 372/70 |
| 7,203,209 | B2 | * | 4/2007 | Young et al. .................... | 372/11 |
| 7,633,990 | B2 | * | 12/2009 | Shori .............................. | 372/70 |
| 2004/0218652 | A1 | * | 11/2004 | Spariosu et al. ................ | 372/70 |

(Continued)

OTHER PUBLICATIONS

Tsai et al., "Saturable absorber Q- and gain-switched all-Yb3+ all-fiber laser at 976 and 1064 nm", Optics Express vol. 18, No. 23, pp. 23523-23528 (Oct. 25, 2010).*

(Continued)

*Primary Examiner* — Eric Bolda
(74) *Attorney, Agent, or Firm* — Bacon & Thomas, PLLC

(57) ABSTRACT

The present invention relates to a Q-switching-induced gain-switched erbium pulse laser system, capable of generating erbium laser pulses within the 2.5 μm to 3.0 μm wavelength region, by means of Q-switching operation at 1.6 μm. At first, an $Er^{3+}$-doped gain medium is pumped and Q-switched at the wavelength region from 1.58 μm to 1.62 μm, so that a Q-switched pulse is formed from the $Er^{3+}$-doped gain medium. The Q-switched pulse results in an instant positive population inversion between the levels $^4I_{11/2}$ and $^4I_{13/2}$ of the $Er^{3+}$-doped gain medium, followed by a gain-switched laser pulse at the wavelength region from 2.5 μm to 3.0 μm.

15 Claims, 3 Drawing Sheets

(56) References Cited

U.S. PATENT DOCUMENTS

| | | | |
|---|---|---|---|
| 2006/0007965 A1* | 1/2006 | Tankovich et al. | 372/10 |
| 2006/0159132 A1* | 7/2006 | Young et al. | 372/10 |
| 2006/0198399 A1* | 9/2006 | Jablonski et al. | 372/10 |
| 2007/0100330 A1* | 5/2007 | Tilleman | 606/17 |
| 2012/0147909 A1* | 6/2012 | Tsai et al. | 372/6 |

OTHER PUBLICATIONS

Tzong-Yow Tsai, Yen-Cheng Fang, Hong-Xi Tsao, Shih-Ting Lin and Chieh Hu; Passively Cascade-Pulsed Erbium ZBLAN Allfiber Laser; Optical Society of America; Jun. 2012; p. 12787-12792; vol. 20, No. 12.

\* cited by examiner

Q-SWITCHING-INDUCED GAIN-SWITCHED ERBIUM PULSE LASER SYSTEM

BACKGROUND OF THE INVENTION

1. Field of the Invention

The present invention relates to Q-switching-induced gain-switched erbium pulse laser system, and more particularly, to an laser system employing a Q-switch component to Q-switch an $Er^{3+}$-doped gain medium, and induce a gain-switched pulse from the $Er^{3+}$-doped gain medium at the wavelength region from 2.5 µm to 3.0 µm.

2. Description of Related Art

Laser, i.e., light radiation with a narrow range of frequencies, is a collimated, monochromatic, and coherent beam produced by stimulated emission amplification and feedback resonance. It is also well-known that the "resonance structure", the "gain medium" and "pumping light source" of three essential requirements must be used for generating a laser.

Moreover, since a laser beam has many advantages in optical properties, the laser beam is widely applied in many technical fields. For example, because water molecules absorb photons within the range of wavelength 2.5 µm to 3.0 µm, the laser beam in the wavelength region can be properly applied in the Biological or Medical field (e.g., cell cauterization and cutting in surgery).

In conventional techniques, generally, the laser pulse within the 2.5 µm to 3.0 µm wavelength region is achieved by employing the conventional active bulk Q-switches. However, the conventional laser system that employs the active bulk Q-switches has disadvantages of large volume, difficulty of optical alignment and high cavity loss.

Compared to the actively pulsed laser system, the passively pulsed laser system has many advantages as compactness, low cost and simple integration with fiber lasers. Moreover, an all-fiber laser structure has the advantages of high efficiency, largely accumulatable gains, exemption for optical alignment, convenient packaging, low cavity loss, small volume, high flexibility, and high quality laser beams of single mode. In addition, the all-fiber laser structure has the diameter of the output mode in micro-scale, so that the outputting laser beams have high photon density.

For the above-mentioned reason, a passively pulsed all-fiber laser system has many advantages over the actively pulsed bulk laser systems. Thus far, a fiber-type saturable absorber Q-switch at this mid-IR range of 2.5-3.0 µm has not been developed for erbium ZBLAN fiber lasers. Hence, it is desirable to provide a novel passive laser system generating laser pulses within the 2.5 µm to 3.0 µm wavelength region.

Therefore, it is desirable to provide a laser system with an Q-switch component that can Q-switch an $Er^{3+}$-doped gain medium so as to generate gain-switched erbium pulses at the wavelength region within the 2.5 µm to 3.0 µm.

SUMMARY OF THE INVENTION

It is one object of the present invention to provide a Q-switching-induced gain-switched erbium pulse laser system, capable of generating erbium laser pulses within the 2.5 µm to 3.0 µm wavelength region, by means of a Q-switch component.

It is another object of the present invention to provide an all-fiber Q-switching-induced gain-switched erbium pulse laser system, capable of generating erbium laser pulses within the 2.5 µm to 3.0 µm wavelength region, by means of a Q-switch component, and capable of achieving higher laser efficiency in an all-fiber laser scheme.

To achieve the object, a Q-switching-induced gain-switched erbium pulse laser system of the present invention includes: a first laser resonator comprising a first reflective component, a second reflective component, an $Er^{3+}$-doped gain medium, and a Q-switch component, wherein the $Er^{3+}$-doped gain medium and the Q-switch component are located between the first reflective component and the second reflective component; a second laser resonator comprising a third reflective component, a fourth reflective component, and the $Er^{3+}$-doped gain medium, wherein the $Er^{3+}$-doped gain medium is located between the second reflective component and the fourth reflective component; and a pumping light source component providing a pumping light source being incident into the laser system; wherein the $Er^{3+}$-doped gain medium is excited by the pumping light source, and creates a gain between levels $^4I_{13/2}$ and $^4I_{15/2}$ of the $Er^{3+}$-doped gain medium; the first laser resonator is Q-switched by the Q-switch component to produce a first laser pulse from the $Er^{3+}$-doped gain medium; the first laser pulse depletes the population on level $^4I_{13/2}$ of the $Er^{3+}$-doped gain medium, and results in a positive population inversion between the level $^4I_{11/2}$ and $^4I_{13/2}$ of the $Er^{3+}$-doped gain medium, so that the second laser resonator is gain-switched to produce a second laser pulse from the $Er^{3+}$-doped gain medium; and the second laser pulse outputs from one end of the fourth reflective component of the second laser resonator.

In particular, the $Er^{3+}$-doped gain medium is excited to create a gain by the pumping light source, and emits photons by spontaneous emission, and the Q-switch component absorbs the photons and prevents lasing in the first resonator, Then, when the pumped gain in the $Er^{3+}$-doped gain medium reaches the lasing threshold, the Q-switch component starts to be absorption saturated and Q-switches the first resonator so as to produce a first laser pulse from the $Er^{3+}$-doped gain medium. Subsequently, the first laser pulse instantaneously results in a positive population inversion between the levels $^4I_{11/2}$ and $^4I_{13/2}$ of the $Er^{3+}$-doped gain medium (i. the first laser pulse instantaneously gain-switches the second laser resonator), so that a second laser pulse is formed from the $Er^{3+}$-doped gain medium. The second laser pulse outputs from one end of the fourth reflective component of the second laser resonator.

Furthermore, there is no limit to the type of the above-mentioned Q-switch component, Preferably, the Q-switch component is an active Q-switch component, or a passive Q-switch component. More preferably, the Q-switch component is a passive)-switch component.

Moreover, according to the Q-switching-induced gain-switched erbium pulse laser system of the present invention, the Q-switching-induced gain-switched erbium pulse laser system is a passively pulsed laser system when the Q-switch component is a passive Q-switch component. There is no limit to the type of the passive Q-switch component. Preferably, the passive Q-switch component is a $Tm^{3+}$-doped crystal, a $Tm^{3+}$-doped glass, or a $Tm^{3+}$-doped fiber. In addition, the above-mentioned $Er^{3+}$-doped gain medium is preferred to be an $Er^{3+}$-doped crystal, an $Er^{3+}$-doped fluoride glass, or an $Er^{3+}$-doped fluoride fiber.

According to this aspect of the present invention, the pumping light source component provides a pumping light source being incident into the Q-switching-induced gain-switched erbium pulse laser system. Further, there is no limit to the type of the pumping light source component generating the pumping light source. Preferably, the pumping light source component is a semiconductor laser diode. Preferably, the wavelength of the pumping light source is between 0.95 μm to 1.01 μm. More preferably, the wavelength of the pumping light source is 0.98 μm.

Specially, the above-mentioned first laser pulse is formed since the $Er^{3+}$-doped gain medium is excited by the pumping light source, and creates a positive population inversion between levels $^4I_{13/2}$ and $^4I_{15/2}$ of $Er^{3+}$ ion of the $Er^{3+}$-doped gain medium. Moreover, the reflection band of the first reflective component and the second reflective component cover all the wavelength region of the first laser pulse. Preferably, the wavelength of the first laser pulse is between 1.58 μm to 1.62 μm.

The first laser resonator is Q-switched by the Q-switch component to produce the first laser pulse from the $Er^{3+}$-doped gain medium. The first laser pulse depletes the population on level $^4I_{13/2}$ of the $Er^{3+}$-doped gain medium, and results in the positive population inversion between the levels $^4I_{11/2}$ and $^4I_{13/2}$ of $Er^{3+}$ ion of the $Er^{3+}$-doped gain medium, Thereby, the second laser pulse is generated by gain-switching. Further, the reflection band of the third reflective component and the fourth reflective component cover all the wavelength region of the second laser pulse, and preferably, the wavelength of the first laser pulse is between 2.50 μm to 3.00 μm.

In the Q-switching-induced gain-switched erbium pulse laser system of the present invention, there is no limit to the first reflective component, the second reflective component, the third reflective component and the fourth reflective component. Each of the first reflective component, the second reflective component, the third reflective component and the fourth reflective component is preferred to be a reflective mirror, a coating surface, or a fiber Bragg grating.

Preferably, the reflectivity of each of the first reflective component and the third reflective component is between 95% and 100%, respectively. More preferably, the reflectivity of each of the first reflective component and the third reflective component is about 100%, respectively.

Preferably, the second reflective component is between 80% and 100%. Preferably, the fourth reflective component may is between 4% and 70%.

Thereby, the Q-switching-induced gain-switched erbium pulse laser system of the present invention. may use an operation of Q-switching to induce an operation of gain-switching, so that a laser pulse within the 2.5 μm to 3.0 μm wavelength region is formed from the $Er^{3+}$-doped gain medium.

To accomplish the above-mentioned object, an all-fiber Q-switching-induced gain-switched erbium pulse laser system of the present invention includes: a pumping light coupling component comprising a first end, a second end and a third end; a saturable absorber Q-switch fiber, wherein one end of the saturable absorber Q-switch fiber is spliced with the second end of the pumping light source coupling component; a first fiber Bragg grating component, wherein one end of the first fiber Bragg grating component is spliced with the other end of saturable absorber Q-switch fiber opposite to the pumping light coupling component; a third fiber Bragg grating component, wherein one end of the third fiber Bragg grating component is spliced with the third end of the pumping light coupling component; an $Er^{3+}$-doped gain fiber, wherein one end of the $Er^{3+}$-doped gain fiber is spliced with the other end of the third fiber Bragg grating component opposite to the pumping light source coupling component; a second fiber Bragg grating component, wherein one end of the second fiber Bragg grating component is spliced with the other end of the $Er^{3+}$-doped gain fiber opposite to the third fiber Bragg grating component; and a fourth fiber Bragg grating component, wherein one end of the fourth fiber Bragg grating component is spliced with the other end of the second fiber Bragg grating component opposite to the $Er^{3+}$-doped gain fiber; wherein the first fiber Bragg grating component, the second fiber Bragg grating component, the $Er^{3+}$-doped gain fiber and the saturable absorber Q-switch fiber form a first laser resonator; the third fiber Bragg grating component, the fourth fiber Bragg grating component and the $Er^{3+}$-doped gain fiber form a second laser resonator; the pumping light source coupling component introduces a pumping light source into the all-fiber Q-switching-induced gain-switched erbium pulse laser system; the $Er^{3+}$-doped gain fiber is excited by the pumping light source, and creates a gain between levels $^4I_{13/2}$ and $^4I_{15/2}$ of the $Er^{3+}$-doped gain fiber; the first laser resonator is Q-switched by the Q-switch component to produce a first laser pulse from the $Er^{3+}$-doped gain fiber; the first laser pulse depletes the population on level $^4I_{13/2}$ of the $Er^{3+}$-doped gain fiber, and results in a positive population inversion between the level $^4I_{13/2}$ and $^4I_{11/2}$ of the $Er^{3+}$-doped gain fiber, so that the second laser resonator is gain-switched to produce a second laser pulse from the $Er^{3+}$-doped gain fiber; and the second laser pulse outputs from the other end of the fourth fiber Bragg grating component opposite to the second fiber Bragg grating component of the second laser resonator.

In particular, the pumping light source coupling component introduces a pumping light source into the all-fiber Q-switching-induced gain-switched erbium pulse laser system; the $Er^{3+}$-doped gain fiber is excited to create a gain by the pumping light source, and emits photons by spontaneous emission, the saturable absorber Q-switch fiber absorbs the photons and prevents lasing in the first resonator. Then, when the pumped gain in the $Er^{3+}$-doped gain fiber reaches the lasing threshold, the saturable absorber Q-switch fiber starts to be absorption saturated and Q-switches the first resonator so as to produce a first laser pulse from the $Er^{3+}$-doped gain fiber. Subsequently, the first laser pulse instantaneously results in the positive population inversion between the levels $^4I_{11/2}$ and $^4I_{13/2}$ of the $Er^{3+}$-doped gain fiber (i.e., the first laser pulse instantaneously gain-switches the second laser resonator), so that a second laser pulse is formed from the $Er^{3+}$-doped gain fiber. The second laser pulse outputs from the other end of the fourth fiber Bragg grating component opposite to the second fiber Bragg grating component of the second laser resonator.

There is no limit to the type of the above-mentioned saturable absorber Q-switch fiber. Preferably, the saturable absorber Q-switch fiber is a $Tm^{3+}$-doped saturable absorber Q-switch fiber. Preferably, the above-mentioned $Er^{3+}$-doped gain fiber is an $Er^{3+}$-doped fluoride fiber. Moreover, the above-mentioned pumping light source coupling component introduces a pumping light source into the all-fiber Q-switching-induced gain-switched erbium pulse laser system of the present invention, wherein, there is no limit to the type of the pumping light source coupling component. Preferably, the pumping light source coupling component is a wavelength division multiplexer, or a pump/signal combiner. Preferably, the wavelength of the pumping light source is between 0.95 μm to 1.01 μm. More preferably, the wavelength of the pumping light source is 0.98 μm.

Specially, the above-mentioned first laser pulse is formed since the $Er^{3+}$-doped gain fiber is excited by the pumping light source, and creates a positive population inversion between levels $^4I_{13/2}$ and $^4I_{15/2}$ of $Er^{3+}$ ion the $Er^{3+}$-doped gain fiber. Furthermore, the reflection band of the first fiber Bragg grating component and the second fiber Bragg grating component cover all the wavelength region of the first laser pulse. Preferably, the wavelength of the first laser pulse is between 1.58 μm to 1.62 μm. Subsequently, the first laser resonator is Q-switched by the Q-switch fiber to produce the first laser pulse from the $Er^{3+}$-doped gain fiber. Then, the first laser pulse depletes the population on level $^4I_{13/2}$ of the $Er^{3+}$-doped gain fiber, and results in a positive population inversion between the levels $^4I_{11/2}$ and $^4I_{13/2}$ of $Er^{3+}$ ion of the $Er^{3+}$-doped gain fiber. Thereby, the second laser pulse is generated by gain-switching. In addition, the reflection band of the third fiber Bragg grating component and the fourth fiber Bragg grating component cover all the wavelength region of the second laser pulse. Preferably, the wavelength of the second laser pulse is between 2.50 μm to 100 μm.

In the all-fiber Q-switching-induced gain-switched erbium pulse laser system of the present invention, preferably, the reflectivity of each of the first fiber Bragg grating component and the third fiber Bragg grating component is between 95% and 100%, respectively. More preferably, the reflectivity of each of the first fiber Bragg grating component and the third fiber Bragg grating component is about 100%, respectively. In addition, the second fiber Bragg grating component is between 80% and 100%. Preferably, the fourth fiber Bragg grating component is between 4% and 70%. Furthermore, in some laser applications, each of the second fiber Bragg grating component and the fourth fiber Bragg grating component may be independently substituted by a flat-cut edge of the fiber. This is, the other end of the $Er^{3+}$-doped gain fiber opposite to the third fiber Bragg grating component may be a flat-cut edge by cleaving tools, providing a similar reflective function of the second fiber Bragg grating component and the fourth fiber Bragg grating component.

Thereby, the all-fiber Q-switching-induced gain-switched erbium pulse laser system of the present invention may use the saturable absorber Q-switch fiber to induce an operation of gain-switching, so that a laser pulse within the 2.5 to 3.0 μm wavelength region is formed from the $Er^{3+}$-doped gain fiber, in an all-fiber laser scheme with high laser efficiency.

DETAILED DESCRIPTION OF THE PREFERRED EMBODIMENT

The following explains the implemented method of the present invention by specific concrete embodiment, and a skilled person in this art could easily understand other advantage and effect of the present invention through the content disclosed by the specification. In addition, the present invention also could be implemented and applied by other different concrete embodiment, and the detail of the present invention also could base on different view and apply for various decorations and changing without deviating the spirit of the present invention.

Preparation 1

Figure 1:
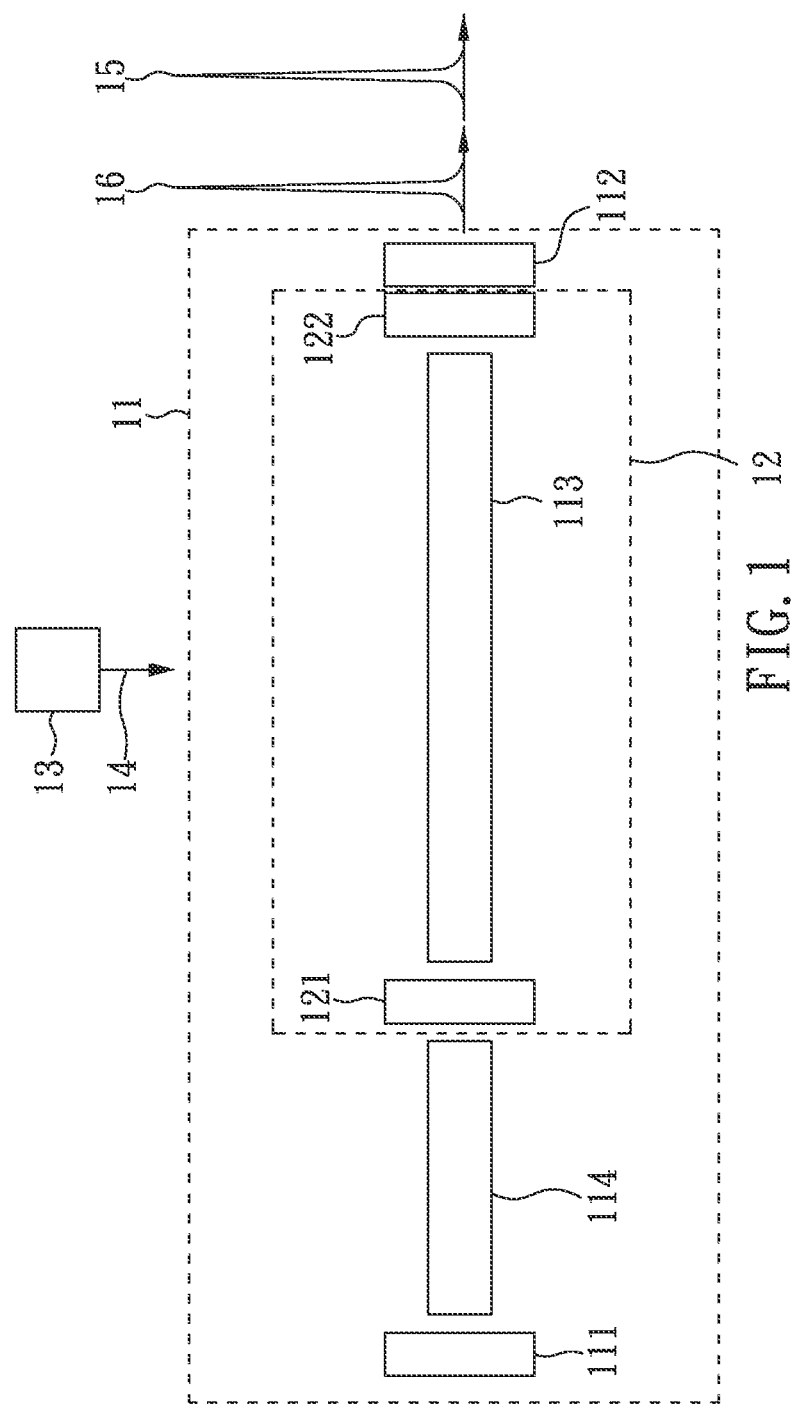
FIG. 1 is a schematic diagram of the Q-switching-induced gain-switched erbium pulse laser system according to the first embodiment of the present invention.

Please refer to FIG. 1, which is a schematic diagram of the Q-switching-induced gain-switched erbium pulse laser system according to the first embodiment of the present invention. As shown FIG. 1, the Q-switching-induced gain-switched erbium pulse laser system according to the first embodiment of the present invention includes: a first laser resonator 11, a second laser resonator 12 and a pumping light source component 13. The first laser resonator 11 comprises: a first reflective component 111, a second reflective component 112, an $Er^{3+}$-doped gain medium 113 and a Q-switch component 114, wherein the $Er^{3+}$-doped gain medium 113 and the Q-switch component 114 are located between the first reflective component 111 and the second reflective component 112. In addition, the second laser resonator comprises 12 comprises: a third reflective component 121, a fourth reflective component 122 and the $Er^{3+}$-doped gain medium 113, wherein the $Er^{3+}$-doped gain medium 113 is located between the third reflective component 121 and the fourth reflective component 122.

In the present embodiment, the pumping light source component 13 provides a pumping light source 14 being incident into the Q-switching-induced gain-switched erbium pulse laser system, so that the pumping light source 14 excites the $Er^{3+}$-doped gain medium 111. There is no limit to the type of the Q-switch component 114. Preferably, the Q-switch component 114 is a passive Q-switch component, or an active Q-switch component. In the present embodiment, the Q-switch component 114 is a passive Q-switch component. Thereby, the Q-switching-induced gain-switched erbium pulse laser system of the present invention is a passively pulsed laser system. Besides, there is no limit to the type of the passive Q-switch component. Preferably, the passive Q-switch component is a $Tm^{3+}$-doped crystal, a $Tm^{3+}$-doped glass, or a $Tm^{3+}$-doped fiber. In the present embodiment, the passive Q-switch component is a $Tm^{3+}$-doped glass. In addition, preferably, the above-mentioned $Er^{3+}$-doped gain medium 113 is an $Er^{3+}$-doped crystal, an $Er^{3+}$-doped fluoride glass, or an $Er^{3+}$-doped fluoride fiber, In the present embodiment, the $Er^{3+}$-doped gain medium 113 is an $Er^{3+}$-doped fluoride glass.

Moreover, the pumping light source 14 is incident into the Q-switching-induced gain-switched erbium pulse laser system of the present invention, Further, there is no limit to the type of the pumping light source component 13 generating the pumping light source 14. Preferably, the pumping light source component 13 is a semiconductor laser diode. In addition, preferably, the wavelength of the pumping light source 14 is between 0.95 μm to 1.01 μm. In the present embodiment, the wavelength of the pumping light source 14 is 0.98 μm.

In the Q-switching-induced gain-switched erbium pulse laser system according the first embodiment of the present invention, there is no limit to the first reflective component 111, the second reflective component 112, the third reflective component 121, and the fourth reflective component 122. Any reflective component capable of reflecting laser beams is applicable to the Q-switching-induced gain-switched erbium pulse laser system of the first embodiment of the present invention. In the present embodiment, the first reflective component 111, the second reflective component 112, the third reflective component 121, and the fourth reflective component 122 are reflective mirrors. In the present embodiment, the reflective wavelength of each of the first reflective component 111 and the second reflective component 112 respectively is 1.60 μm, and the reflective wavelength of each of the third reflective component 121 and the fourth reflective component 122 respectively is 2.65 μm. In addition, the reflectivity of each of the first reflective component 111 and the third reflective component 121 respectively is between 95 and 100%, the second reflective component 112 is between 80% and 100%, and the fourth reflective component 122 is between 4% and 70%.

The following description illustrates the working principle of the Q-switching-induced gain-switched erbium pulse laser system in details according to the first embodiment of the present invention.

First, the pumping light source component 13 provides the pumping light source 14 being incident into the Q-switching-induced gain-switched erbium pulse laser system of the first embodiment of the present invention, so that the $Er^{3+}$-doped gain medium 113 is excited by the pumping light source 14. The $E^{3+}$-doped gain medium 113 is excited to create a gain, and emits photons by spontaneous emission, the Q-switch component 114 absorbs the photons and prevents lasing of the first resonator 11. Subsequently, when the pumped gain in the $Er^{3+}$-doped gain medium 113 reaches the lasing threshold, the Q-switch component 114 starts to be absorption saturated, and the first laser resonator 11 is Q-switched to produce a first laser pulse 15. Then, part of the first laser pulse 15 is outputted through the second reflective component 112, and the rest of the first laser pulse 15 is reflected by the second reflective component 112 back to the)-switching-induced gain-switched erbium pulse laser system of the first embodiment of the present invention.

The first laser pulse 15 instantaneously results in the positive population inversion between the levels $^4I_{11/2}$ and $^4I_{13/2}$ of the $Er^{3+}$-doped gain medium 113 (i.e., the first laser pulse 15 instantaneously gain-switches the second laser resonator 12), so that a second laser pulse 16 is subsequently formed from the $Er^{3+}$-doped gain medium 113. Then, the second laser pulse 16 is outputted through one end of the fourth reflective component 122 of the second laser resonator 12.

Figure 2:
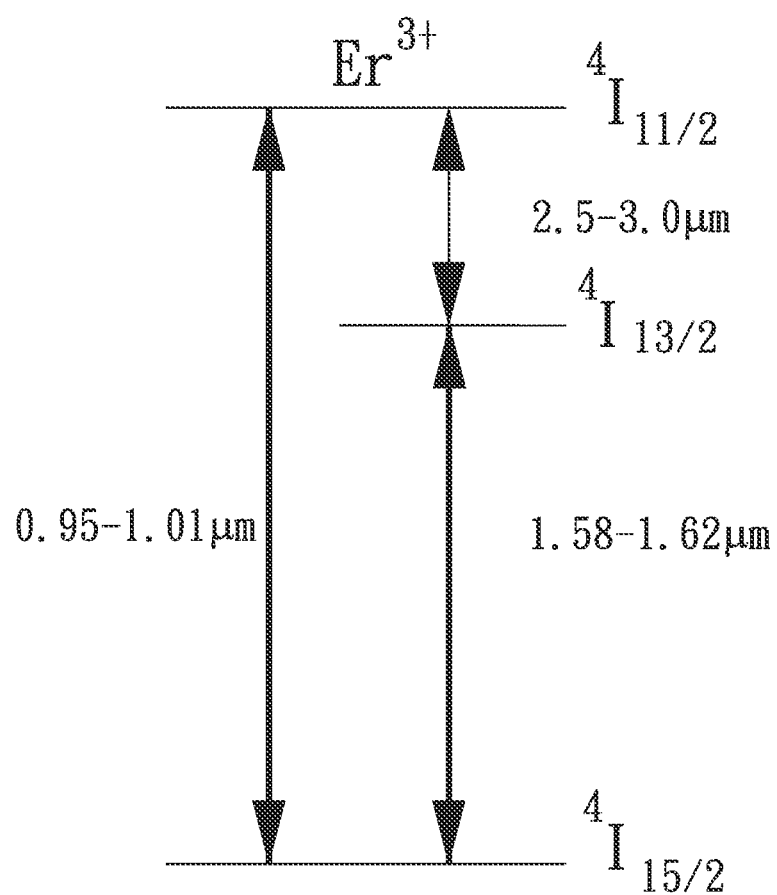
FIG. 2 is a schematic diagram of energy levels of $Er^{3+}$ ion of the $Er^{3+}$-doped gain medium located in the Q-switching-induced gain-switched erbium pulse laser system according to the first embodiment of the present invention.

In addition to FIG. 1, please also refer to FIG. 2, which is a schematic diagram of energy levels of $Er^{3+}$ ion of the $Er^{3+}$-doped gain medium located in the Q-switching-induced gain-switched erbium pulse laser system according to the first embodiment of the present invention. As illustrated above, the $Er^{3+}$-doped gain medium 113 is excited by the pumping light source 14, and creates the positive population inversion between levels $^4I_{13/2}$ and $^4I_{15/2}$ of $Er^{3+}$ ion of the $Er^{3+}$-doped gain medium 113, so that the first laser pulse 15 is emitted from the $Er^{3+}$-doped gain medium 113. Furthermore, as shown FIG. 2, due to the energy transfer between levels $^4I_{13/2}$ and $^4I_{15/2}$ of $Er^{3+}$ ion, the $Er^{3+}$-doped gain medium 113 having $Er^{3+}$ ion emits the laser pulse at the wavelength region from 1.58 μm to 1.62 μm. In the present embodiment, the wavelength of the first laser pulse 15 is about 1.60 μm.

Subsequently, the first laser pulse 15 depletes the population on level $^4I_{13/2}$ of the $Er^{3+}$-doped gain medium 113, and results in a positive population inversion between the level $^4I_{11/2}$ and $^4I_{13/2}$ of $Er^{3+}$ ion of the $Er^{3+}$-doped gain medium 113. Thereby, the second laser pulse 16 is generated by gain-switching. As shown FIG. 2, Due to the energy transfer between levels $^4I_{11/2}$ and $^4I_{13/2}$ of $Er^{3+}$ ion, the $Er^{3+}$-doped gain medium 113 having $Er^{3+}$ ion emits the laser pulse at the wavelength region from 2.50 μm to 3.00 μm. In the present embodiment, the wavelength of the second laser pulse 16 is about 2.65 μm.

As a result, the mechanism resulting in the laser pulse having the wavelength at 2.65 μm in the Q-switching-induced gain-switched erbium pulse laser system of the first embodiment in the present invention makes a conclusion as following:

The $Er^{3+}$-doped gain medium 113 is excited by the pumping light source 14, and creates the positive population inversion between levels $^4I_{13/2}$ and $^4I_{15/2}$ of $Er^{3+}$ ion of the $Er^{3+}$-doped gain medium 113. Then, when the pumped gain reaches the lasing threshold, the Q-switch component 114 absorbs the emitted photons and reaches an absorption saturation situation. Accordingly, the first laser pulse 15 having the wavelength at 1.60 μm is formed from the $Er^{3+}$-doped gain medium 113 when the Q-switch component 114 reaches the absorption saturation situation and Q-switches the first laser resonator 11. Subsequently, the first laser pulse 15 depletes the population on level $^4I_{13/2}$ of the $Er^{3+}$-doped gain medium 113, and results in a positive population inversion between the level $^4I_{11/2}$ and $^4I_{13/2}$ of $Er^{3+}$ ion of the $Er^{3+}$-doped gain medium 113, so that the second laser pulse 16 having the wavelength at 2.65 μm is formed by gain-switching. The second laser pulse 16 is outputted from one end of the fourth reflective component 122 of the second laser resonator 12.

Preparation 2

Figure 3:
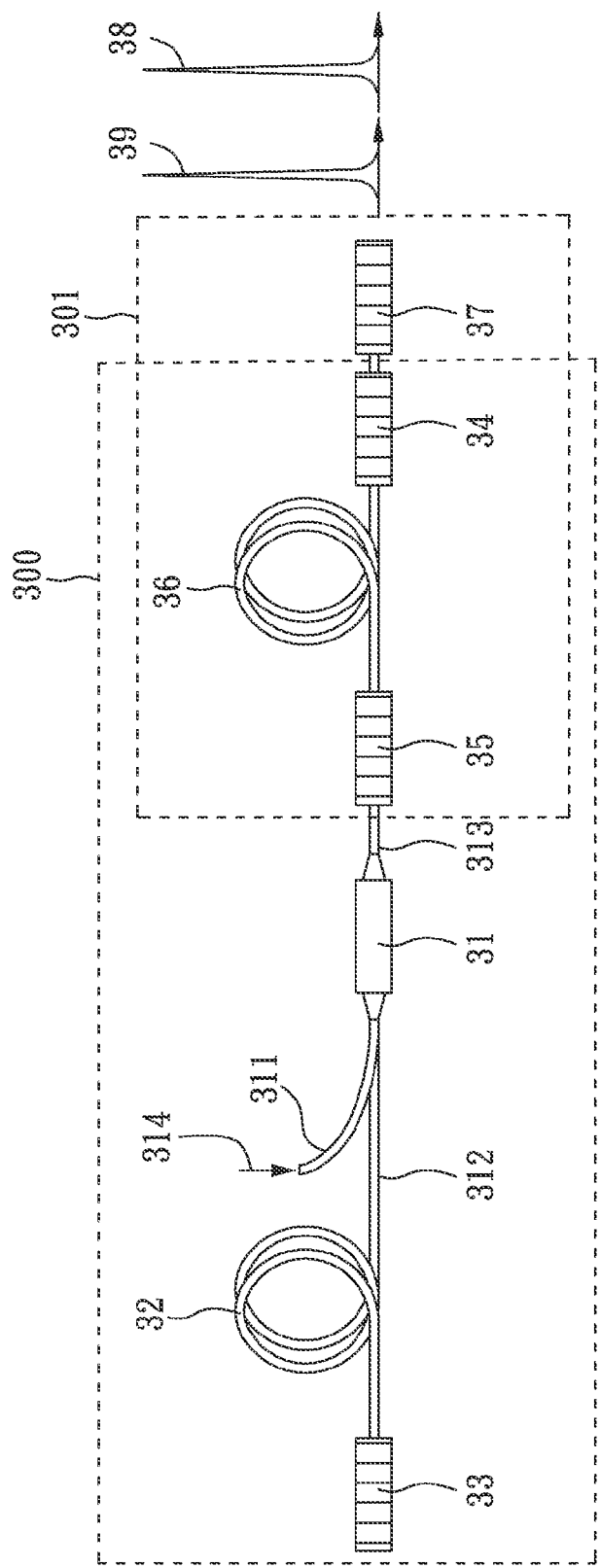
FIG. 3 is a schematic diagram of the all-fiber Q-switching-induced gain-switched erbium pulse laser system according to the second embodiment of the present invention.

Please refer to FIG. 3, which is a schematic diagram of the all-fiber Q-switching-induced gain-switched erbium pulse laser system according to the second embodiment of the present invention. As shown FIG. 3, the all-fiber Q-switching-induced gain-switched erbium pulse laser system according to the second embodiment of the present invention includes: a pumping light coupling component 31, a saturable absorber Q-switch fiber 32, a first fiber Bragg grating component 33, a second fiber Bragg grating component 34, a third fiber Bragg grating component 35, an $Er^{3+}$-doped gain fiber 36 and a fourth fiber Bragg grating component 37.

Furthermore, as shown FIG. 3, in the all-fiber Q-switching-induced gain-switched erbium pulse laser system of the second embodiment of the present invention, the first fiber Bragg grating component 33, the second fiber Bragg grating component 34, the $Er^{3+}$-doped gain fiber 36, and the saturable absorber Q-switch fiber 32 form a first laser resonator 300. The third fiber Bragg grating component 35, the fourth fiber Bragg grating component 37 and the $Er^{3+}$-doped gain fiber 36 form a second laser resonator 301.

The pumping light coupling component 31 comprising a first end 311, a second end 312 and a third end 313. Further, one end of the saturable absorber Q-switch fiber 32 is spliced with the second end 312 of the pumping light source coupling component 31, and one end of the first fiber Bragg grating component 33 is spliced with the other end of saturable absorber Q-switch fiber 32 opposite to the pumping light coupling component 31. Furthermore, one end of the third fiber Bragg grating component 35 is spliced with the third end 313 of the pumping light coupling component 31, and one end of the $Er^{3+}$-doped gain fiber 36 is spliced with the other end of the third fiber Bragg grating component 35 opposite to the pumping light source coupling component 31. Moreover, one end of the second fiber Bragg grating component 34 is spliced with the other end of the $Er^{3+}$-doped gain fiber 36 opposite to the third fiber Bragg grating component 35, and one end of the fourth fiber Bragg grating component 37 is spliced with the other end of the second fiber Bragg grating component 34 opposite to the $Er^{3+}$-doped gain fiber 36.

There is no limit to the above-mentioned saturable absorber Q-switch fiber 32. In the present embodiment, the saturable absorber Q-switch fiber 32 is a $Tm^{3+}$-doped saturable absorber Q-switch fiber. In addition, the $Er^{3+}$doped gain fiber 36 is an $Er^{3+}$-doped fluoride fiber.

Moreover, the pumping light source coupling component 31 introduces a pumping light source 314 into the all-fiber Q-switching-induced gain-switched erbium pulse laser system of the second embodiment of the present invention, as shown FIG. 3. There is no limit to how the pumping light source 314 is generated. In the present embodiment, a semiconductor laser diode provides the pumping light source 314. In addition, preferably, the wavelength of the pumping light source 314 is between 0.95 μm to 1.01 μm. In the present embodiment, the wavelength of the pumping light source 314 is 0.98 μm.

In the present embodiment, the reflective wavelength of each of the first fiber Bragg grating component 33 and the second fiber Bragg grating component 34 respectively is 1.60 μm, and the reflective wavelength of each of the third fiber Bragg grating component 35 and the fourth fiber Bragg grating component 37 respectively is 2.65 μm. The reflectivity of each of the first fiber Bragg grating component 33 and the third fiber Bragg grating component 35 respectively is between 95% and 100%, the second fiber Bragg grating component 34 is between 80% and 100%, and the fourth fiber Bragg grating component 37 is between 4% and 70%.

The following description illustrates the working principle of the all-fiber Q-switching-induced gain-switched erbium pulse laser system in details according the second embodiment of the present invention.

First, the first end 311 of the pumping light source coupling component 31 introduces the pumping light source 314 into the all-fiber Q-switching-induced gain-switched erbium pulse laser system of the second embodiment of the present invention, so that the $Er^{3+}$-doped gain fiber 36 is excited by the pumping light source 314. The $Er^{3+}$-doped gain fiber 36 is excited to create a gain, and emits photons by spontaneous emission. The saturable absorber Q-switch fiber 32 absorbs the photons and prevents lasing of the first resonator. Then, when the pumped gain in the $Er^{3+}$-doped gain fiber 36 reaches the lasing threshold, the saturable absorber Q-switch fiber 32 starts to be absorption saturated, and the first laser resonator 300 is Q-switched to produce a first laser pulse 38. Accordingly, part of the first laser pulse 38 is outputted through the second fiber Bragg grating component 34, and the rest of the first laser pulse 38 is reflected by the second fiber Bragg grating component 34 back to the all-fiber Q-switching-induced gain-switched erbium pulse laser system of the second embodiment of the present invention.

The first laser pulse 38 instantaneously results in a positive population inversion between the levels $^4I_{11/2}$, and $^4I_{13/2}$ of the $Er^{3+}$-doped gain fiber 36 the first laser pulse 38 instantaneously gain-switches the second laser resonator 301), so that the second laser pulse 39 is subsequently formed from the $Er^{3+}$-doped gain fiber 36. Then, the second laser pulse 39 is outputted through the other end of the fiber Bragg grating component 37 opposite to the second Bragg grating component 34 of the second laser resonator 301.

Moreover, due to the all-fiber Q-switching-induced gain-switched erbium pulse laser system of the second embodiment of the present invention, the transitions of the energy levels of $Er^{3+}$ ions of $Er^{3+}$-doped gain fiber for generating the first laser pulse and the second laser pulse is identical to the first embodiment of the present invention, as shown FIG. 2. Thereby, with reference to the transitions of the energy levels of $Er^{3+}$ ions of $Er^{3+}$- doped gain fiber for generating the first laser pulse and the second laser pulse in the second embodiment of the present invention will not be discussed further here.

Therefore, the mechanism resulting in the laser pulse having the wavelength at 2.65 μm in the all-fiber Q-switching-induced gain-switched erbium pulse laser system of the second embodiment in the present invention makes a conclusion as following.

The pumping light source coupling component 31 introduces the pumping light source 314 into the all-fiber Q-switching-induced gain-switched erbium pulse laser system of the second embodiment of the present invention, so that the $Er^{3+}$-doped gain fiber 36 is excited by the pumping light source 314, and creates the positive population inversion between levels $^4I_{13/2}$ and $^4I_{15/2}$ of $Er^{3+}$ ion of the $Er^{3+}$-doped gain fiber 36. Subsequently, when the pumped gain reaches the lasing threshold, the saturable absorber Q-switch fiber 32 absorbs the emitted photons and reaches an absorption saturation situation. Then, a first laser pulse 38 having the wavelength at 1.60 μm is formed from the $Er^{3+}$-doped gain fiber 36 when the saturable absorber Q-switch fiber 32 reaches the absorption saturation situation and Q-switches the first laser resonator 300. Accordingly, the first laser pulse 38 depletes the population on level $^4I_{13/2}$ of the $Er^{3+}$-doped gain fiber 36, and results in a positive population inversion between the level $^4I_{11/2}$ and $^4I_{13/2}$ of $Er^{3+}$ ion of the $Er^{3+}$-doped gain fiber 36. Thereby, the second laser pulse 39 having the wavelength at 2.65 μm is formed by gain-switching. Furthermore, the second laser pulse 39 passes through the fourth Bragg grating component 37 of the second laser resonator 301 and is outputted. from the all-fiber Q-switching-induced gain-switched erbium pulse laser system of the second embodiment of the present invention.

Although the present invention has been explained in relation to its preferred embodiment, it is to be understood that many other possible modifications and variations can be made without departing from the spirit and scope of the present invention as hereinafter claimed.

What is claimed is:

1. A Q-switching-induced gain-switched erbium pulse laser system comprising:
   a first laser resonator comprising a first reflective component, a second reflective component, an $Er^{3+}$-doped gain medium, and a Q-switch component, wherein the $Er^{3+}$-doped gain medium and the Q-switch component are located between the first reflective component and the second reflective component;
   a second laser resonator comprising a third reflective component, a fourth reflective component, and the $Er^{3+}$-doped gain medium, wherein the $Er^{3+}$-doped gain medium is located between the second reflective component and the fourth reflective component; and
   a pumping light source component providing a pumping light being incident into the laser system;
   wherein the $Er^{3+}$-doped gain medium is excited by the pumping light source, and creates a gain between levels $^4I_{13/2}$ and $^4I_{15/2}$ of the $Er^{3+}$-doped gain medium; the first laser resonator is Q-switched by the Q-switch component to produce a first laser pulse from the $Er^{3+}$-doped gain medium; the first laser pulse depletes the population on level $^4I_{13/2}$ of the $Er^{3+}$-doped gain medium, and results in a positive population inversion between the level $^4I_{11/2}$ and $^4I_{13/2}$ of the $Er^{3+}$-doped gain medium, so that the second laser resonator is gain-switched to produce a second laser pulse from the $Er^{3+}$-doped gain medium; and the second laser pulse outputs from one end of the fourth reflective component of the second laser resonator;
   wherein the reflectivity of each of the first reflective component and the third reflective component is between 95% and 100%, respectively, the second reflective component is between 80% and 100%, and the fourth reflective component is between 4% and 70%.

2. The Q-switching-induced gain-switched erbium pulse laser system as claimed in claim 1, wherein the Q-switch component is an active Q-switch component, or a passive Q-switch component.

3. The Q-switching-induced gain-switched erbium pulse laser system as claimed in claim 2, wherein the passive Q-switch component is a $Tm^{3+}$-doped crystal, a $Tm^{3+}$-doped glass, or a $Tm^{3+}$-doped fiber.

4. The Q-switching-induced gain-switched erbium pulse laser system as claimed in claim 1, wherein the $Er^{3+}$-doped gain medium is an $Er^{3+}$-doped crystal, an $Er^{3+}$-doped fluoride glass, or an $Er^{3+}$-doped fluoride fiber.

5. The Q-switching-induced gain-switched erbium pulse laser system as claimed in claim 1, wherein the wavelength of the pumping light source is between 0.95 μm to 1.01 μm.

6. The Q-switching-induced gain-switched erbium pulse laser system as claimed in claim 1, wherein the wavelength of the first laser pulse is between 1.58 μm to 1.62 μm.

7. The Q-switching-induced gain-switched erbium pulse laser system as claimed in claim 1, wherein the wavelength of the second laser pulse is between 2.50 μm to 3.00 μm.

8. The Q-switching-induced gain-switched erbium pulse laser system as claimed in claim 1, wherein each of the first reflective component, the second reflective component, the third reflective component, and the fourth reflective component independently is a reflective mirror, a coating surface, or a fiber Bragg grating.

9. An all-fiber Q-switching-induced gain-switched erbium pulse laser system comprising:
a pumping light coupling component comprising a first end, a second end, and a third end;
a saturable absorber Q-switch fiber, wherein one end of the saturable absorber Q-switch fiber is spliced with the second end of the pumping light source coupling component;
a first fiber Bragg grating component, wherein one end of the first fiber Bragg grating component is spliced with the other end of saturable absorber Q-switch fiber opposite to the pumping light coupling component;
a third fiber Bragg grating component, wherein one end of the third fiber Bragg grating component is spliced with the third end of the pumping light coupling component;
an $Er^{3+}$-doped gain fiber, wherein one end of the $Er^{3+}$-doped gain fiber is spliced with the other end of the third fiber Bragg grating component opposite to the pumping light source coupling component;
a second fiber Bragg grating component, wherein one end of the second fiber Bragg grating component is spliced with the other end of the $Er^{3+}$-doped gain fiber opposite to the third fiber Bragg grating component; and
a fourth fiber Bragg grating component, wherein one end of the fourth fiber Bragg grating component is spliced with the other end of the second fiber Bragg grating component opposite to the $Er^{3+}$-doped gain fiber;
wherein the first fiber Bragg grating component, the second fiber Bragg grating component, the $Er^{3+}$-doped gain fiber, and the saturable absorber Q-switch fiber form a first laser resonator; the third fiber Bragg grating component, the fourth fiber Bragg grating component, and the $Er^{3+}$-doped gain fiber form a second laser resonator; the pumping light source coupling component introduces a pumping light source into the all-fiber Q-switching-induced gain-switched erbium pulse laser system; the $Er^{3+}$-doped gain fiber is excited by the pumping light source, and creates a gain between levels $^4I_{13/2}$ and $^4I_{15/2}$ of the $Er^{3+}$-doped gain fiber; the first laser resonator is Q-switched by the Q-switch component to produce a first laser pulse from the $Er^{3+}$-doped gain fiber; the first laser pulse depletes the population on level $^4I_{13/2}$ of the $Er^{3+}$-doped gain fiber, and results in a positive population inversion between the level $^4I_{11/2}$ and $^4I_{13/2}$ of the $Er^{3+}$-doped gain fiber, so that the second laser resonator is gain-switched to produce a second laser pulse from the $Er^{3+}$-doped gain fiber; and the second laser pulse outputs from the other end of the fourth fiber Bragg grating component opposite to the second Bragg grating component of the second laser resonator; wherein the reflectivity of each of first fiber Bragg grating component and the third fiber Bragg grating component is respectively between 95% and 100%, the second fiber Bragg grating component is between 80% and 100%, and the fourth fiber Bragg grating component is between 4% and 70%.

10. The all-fiber Q-switching-induced gain-switched erbium pulse laser system as claimed in claim 9, wherein the saturable absorber Q-switch fiber is a $Tm^{3+}$-doped saturable absorber Q-switch fiber.

11. The all-fiber Q-switching-induced gain-switched erbium pulse laser system as claimed in claim 9, wherein the $Er^{3+}$-doped gain fiber is an $Er^{3+}$-doped fluoride fiber.

12. The all-fiber Q-switching-induced gain-switched erbium pulse laser system as claimed in claim 9, wherein the wavelength of the pumping light source is between 0.95 μm to 1.01 μm.

13. The all-fiber Q-switching-induced gain-switched erbium pulse laser system as claimed in claim 9, wherein the wavelength of the first laser pulse is between 1.58 μm to 1.62 μm.

14. The all-fiber Q-switching-induced gain-switched erbium pulse laser system as claimed in claim 9, wherein the wavelength of the second laser pulse is between 2.50 μm to 3.00 μm.

15. The all-fiber Q-switching-induced gain-switched erbium pulse laser system as claimed in claim 9, wherein each of the second fiber Bragg grating component and the fourth fiber Bragg grating component independently is a flat-cut edge of the fiber.

* * * * *